(12) United States Patent
Setlur et al.

(10) Patent No.: US 8,383,559 B2
(45) Date of Patent: Feb. 26, 2013

(54) RELEASABLE CORROSION INHIBITORS

(75) Inventors: Deepthi R. Setlur, Cypress, TX (US);
Stefan M. Butuc, The Woodlands, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 12/903,790

(22) Filed: Oct. 13, 2010

(65) Prior Publication Data
US 2012/0091396 A1  Apr. 19, 2012

(51) Int. Cl.
*C23F 11/00* (2006.01)
*C23F 11/10* (2006.01)
*C23F 11/18* (2006.01)
*E21B 43/00* (2006.01)
*C09K 8/00* (2006.01)

(52) U.S. Cl. ........ 507/219; 507/234; 507/269; 507/939; 252/387; 252/388; 252/397; 252/399; 422/7; 422/12; 422/13; 508/154; 508/161; 508/165; 175/91; 175/227; 175/228; 175/229; 175/327; 175/371

(58) Field of Classification Search ........ 422/7, 12, 422/13; 252/387, 388, 397, 399; 507/219, 507/234, 269, 939; 175/327, 371; 977/773, 977/774, 775, 776, 777, 778, 779, 780, 783; 508/154, 161, 165

See application file for complete search history.

(56) References Cited

U.S. PATENT DOCUMENTS

| | | |
|---|---|---|
| 6,207,130 B1 | 3/2001 | Kareiva et al. |
| 6,887,517 B1 | 5/2005 | Cook et al. |
| 6,933,046 B1 * | 8/2005 | Cook ............................ 428/402 |
| 6,986,943 B1 | 1/2006 | Cook et al. |
| 7,013,998 B2 | 3/2006 | Ray et al. |
| 7,141,277 B1 | 11/2006 | Vaia et al. |
| 7,204,312 B2 | 4/2007 | Roddy et al. |
| 7,244,498 B2 | 7/2007 | Cook et al. |
| RE40,197 E | 4/2008 | Ray et al. |
| 2005/0176851 A1 * | 8/2005 | Cook ............................ 523/210 |
| 2007/0254817 A1 | 11/2007 | Griffo et al. |
| 2008/0216395 A1 * | 9/2008 | Schaeffer et al. ............... 44/530 |
| 2009/0038858 A1 * | 2/2009 | Griffo et al. .................. 175/371 |

(Continued)

FOREIGN PATENT DOCUMENTS

| | | |
|---|---|---|
| EP | 1832629 A1 | 9/2007 |
| GB | 2462389 A | 2/2010 |

(Continued)

OTHER PUBLICATIONS

PCT/US2011/054148 International Search Report and Written Opinion dated Dec. 27, 2011 (13 p.).

(Continued)

*Primary Examiner* — Joseph D Anthony
(74) *Attorney, Agent, or Firm* — Conley Rose, P.C.

(57) ABSTRACT

The present invention includes compositions and methods of supplying a corrosion inhibitor including placing a corrosion inhibitor attached to a nanostructure carrier, placing the nanostructure carrier containing the corrosion inhibitor at a location and the nanostructure carrier is capable of releasing the corrosion inhibitor.

13 Claims, 12 Drawing Sheets

U.S. PATENT DOCUMENTS

| | | | |
|---|---|---|---|
| 2009/0078153 A1* | 3/2009 | Shchukin et al. | 106/14.44 |
| 2009/0118380 A1* | 5/2009 | Del Gaudio et al. | 514/772 |
| 2009/0184283 A1* | 7/2009 | Chung et al. | 252/67 |
| 2009/0306241 A1* | 12/2009 | Allard et al. | 522/83 |
| 2011/0297038 A1* | 12/2011 | Lvov et al. | 106/14.05 |

FOREIGN PATENT DOCUMENTS

| | | |
|---|---|---|
| WO | 2007/112967 A1 | 10/2007 |

OTHER PUBLICATIONS

Shchukin, et al., "Self-Repairing Coatings Containing Active Nanoreservoirs," 2007, 3, No. 6, 926-943 (18 p.).

R.L. Cook, A.W. Myers, & J.E. Elliott; Chromate-Free On-Demand Releasable Corrosion Inhibitors for Aluminum Alloys; 2005 Tri-Service Corrosion Conference, pp. 1-8.

* cited by examiner

Figure 10
Figure 11
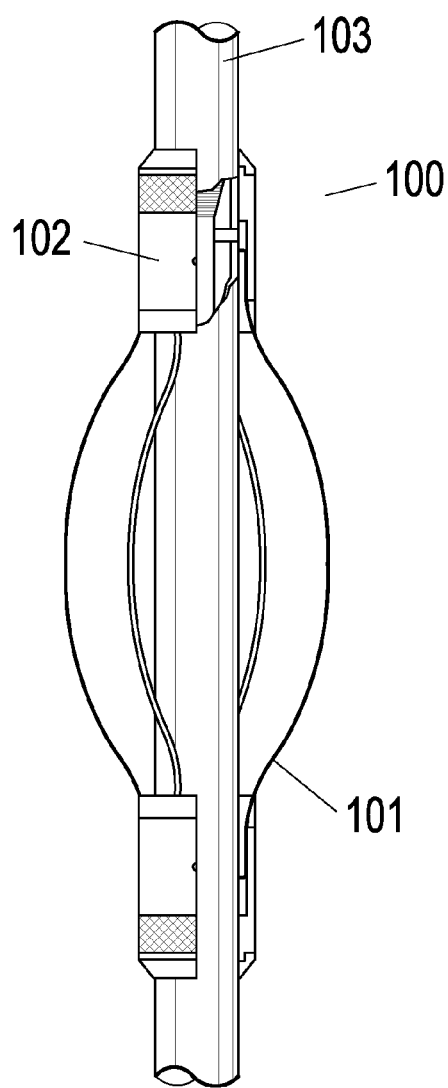
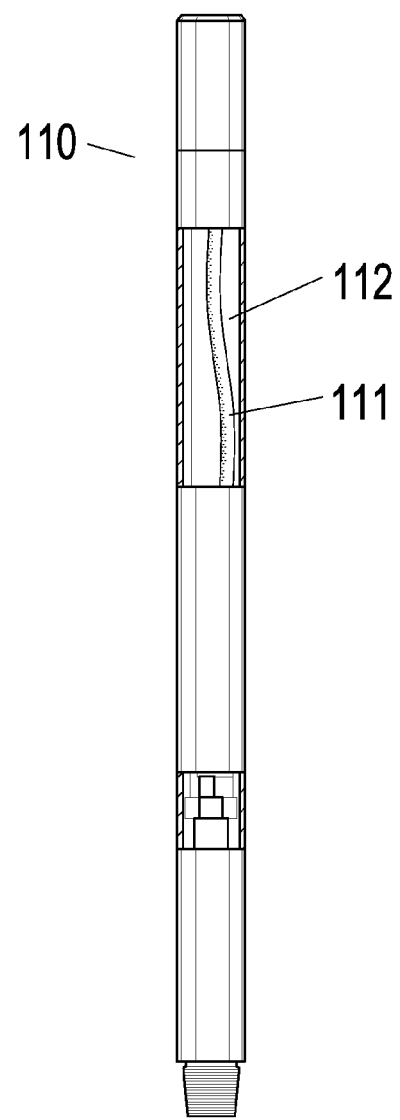

RELEASABLE CORROSION INHIBITORS

STATEMENT REGARDING FEDERALLY SPONSORED RESEARCH OR DEVELOPMENT

Not Applicable.

FIELD

Embodiments of the present invention relate to corrosion inhibitors for use in a corrosive environment. Embodiments of the present invention relate generally to materials and methods of their use that release one or more types of corrosion inhibitors upon command or in a predetermined manner.

BACKGROUND

Oilfield operations typically involve the use of mechanical equipment, such as pumps and motors. This equipment is generally made of metallic substances and requires maintenance to continue to function properly. In the course of oil and gas drilling and production, this mechanical equipment may be present in downhole and subsea environments. These environments typically are corrosive environments. Such corrosive environments contribute to the corrosion of the mechanical equipment, including motors and pumps, which can cause them to fail.

Corrosion can cause problems in oilfield operations. Corrosion can increase drilling and production costs. Corrosion can also cause downtime in drilling, which leads to increased costs. To overcome these costs and delays, mechanical equipment having a hardened coating, such as a tungsten carbide coating, has been used to provide enhanced corrosion and wear resistance. However, due to the elevated costs of these coatings, only a small percentage of mechanical equipment in the field has this coating.

Corrosion inhibitors have been used to contain or prevent corrosion. Certain corrosion inhibitors include surfactants, which have been employed to inhibit corrosion or to improve the performance of certain organic corrosion inhibitor systems. Many oil wells produce mixtures having high water content, therefore, conventional oil-soluble mixtures have been formulated with both fatty acids and a variety of surfactants.

However, this approach has proven limited in its scope. The use of enough surfactant to render the oil-soluble molecule water-soluble has dramatically reduced film formation and film persistency, leaving the corrosion inhibitor susceptible to washing off of the metal, leaving the metal unprotected. Also, these inhibitors have a tendency to emulsify under downhole conditions, resulting in major problems for the user. Although these inhibitors have found limited use in oil and gas pipelines, they have not yet proven to successfully inhibit corrosion when utilized under the environments typical of producing oil wells.

In addition, corrosion in an oilfield environment may be initiated at a specific location on a specific piece of equipment at a specific time. However, such information on where and when corrosion may start may not be available to technicians in the oil field. This delay allows for the corrosion to progress, resulting in greater damage to mechanical equipment in the field.

In view of the above, it would be desirable to have an improved delivery system that supplies a sufficient amount of corrosion inhibitor at specific locations in order to stop or contain the corrosion in its early stages. It would also be desirable to supply a corrosion inhibitor that would be successful in containing or preventing corrosion under the environments typical of producing oil wells.

SUMMARY

In an embodiment, a method of supplying a corrosion inhibitor to a metal comprises combining a corrosion inhibitor with a nanostructure carrier (the combination referred to herein as "a corrosion inhibitor/nanostructure carrier combination"). As used herein, the term "combine" or "combining" refers to the incorporation of two or more entities via any suitable interaction known to one skilled in the art. Such interaction includes and is not limited to adsorption (chemisorption and physisorption), chemical bonding, and electrostatic interaction.

In another embodiment, a method of supplying a corrosion inhibitor to a metal comprises placing a corrosion inhibitor/nanostructure carrier combination in the vicinity of a metal where it is capable of releasing a corrosion inhibitor. In some embodiments, the method further comprises attaching a corrosion inhibitor to a nanostructure carrier to form the corrosion inhibitor/nanostructure carrier combination. In some embodiments, the method further comprises releasing the corrosion inhibitor from the corrosion inhibitor/nanostructure carrier combination.

In a further embodiment, the corrosion inhibitor/nanostructure carrier combination is combined with a lubricant, an elastomer, a coating, placed within the matrix of a metallic surface, located within a solid encapsulated bearing, or combinations thereof.

In an embodiment, the corrosion inhibitor is released upon normal wear of the metallic surface, under standard operating conditions, and/or upon a triggering condition. In another embodiment, the corrosion inhibitor is released over time or upon a change in condition such as upon a change in pressure, temperature, or pH.

In yet a further embodiment, the corrosion inhibitor is located adjacent to an oilfield tool such as a drill bit, a rotor, a stator, a motor, a pump, a drive shaft assembly, a dump sub, a bearing assembly, a blowout preventer (BOP), a packer, drill pipe, tubing, casing, a completion tool, a production tool, a fishing tool, an agitator, a stabilizer, a centralizer, and combinations thereof.

In an embodiment, the corrosion inhibitor is located within one or more elastomeric component, referred to as an elastomer. In some embodiments, the elastomer is permeable to the corrosion inhibitor and capable of releasing the corrosion inhibitor from the elastomer under standard operating conditions. In some embodiments, the elastomer is non-permeable to the corrosion inhibitor under standard operating conditions and permeable to the corrosion inhibitor under imposed conditions. In some cases, the elastomer is permeable to the corrosion inhibitor under a change in pressure, a change in temperature, a change in pH, or is increasingly permeable to the corrosion inhibitor over time.

Also disclosed herein is a composition for inhibiting corrosion, comprising a nanostructure carrier with a corrosion inhibitor attached forming a corrosion inhibitor/nanostructure carrier combination. In some embodiments, the corrosion inhibitor/nanostructure carrier combination is selected from the group consisting of graphines, nanotubes, nanohorns, nanolattice, and combinations thereof. In some embodiments, the corrosion inhibitor/nanostructure carrier combination is located adjacent to an oilfield tool, such as a drill bit, a rotor, a stator, a motor, a pump, a drive shaft assembly, a dump sub, a bearing assembly, a blowout preventer, a packer, drill pipe, tubing, casing, a completion tool, a production tool, a fishing tool, an agitator, a stabilizer, a centralizer, and combinations thereof.

In an embodiment, a method of preventing corrosion comprises combining a corrosion inhibitor with a nanostructure carrier, containing the corrosion inhibitor and nanostructure carrier within an elastomer, and placing the elastomer containing the corrosion inhibitor in the vicinity of a surface subject to corrosion wherein the elastomer is permeable to the corrosion inhibitor and capable of releasing the corrosion inhibitor from the elastomer. In some embodiments, the elastomer is located adjacent to an oilfield tool, such as a drill bit, a rotor, a stator, a motor, a pump, a drive shaft assembly, a dump sub, a bearing assembly, a blowout preventer, a packer, drill pipe, tubing, casing, a completion tool, a production tool, a fishing tool, an agitator, a stabilizer, a centralizer, and combinations thereof.

BRIEF DESCRIPTION OF DRAWINGS

FIG. 10 is an illustration of a centralizer having elements in accordance with an embodiment, of the present invention.

FIG. 11 is an illustration of an agitator having elements in accordance with an embodiment, of the present invention.

DETAILED DESCRIPTION

Figure 1:
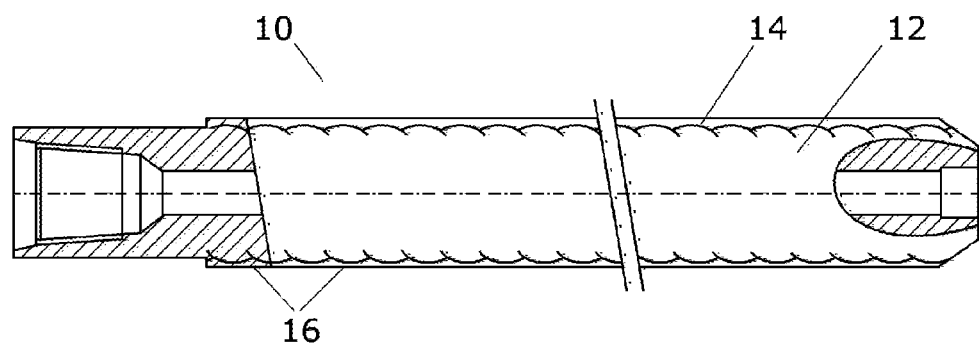
FIG. 1 is an illustration of a PC pump in accordance with an embodiment, of the present invention.

The present invention includes methods and compositions directed to localized and generalized on demand release of and distribution of corrosion inhibitors.

Corrosion inhibitors can be generally divided into two broad categories, those that enhance the formation of a native protective oxide film through an oxidizing effect, and those that inhibit corrosion by selectively adsorbing on the metal surface and creating a barrier that prevents access of the corrosive agent to the surface. In the former group are materials such as inorganic chromates, inorganic nitrates, molybdates and organic nitrates. The latter group includes materials such as carbonates, silicates and phosphates and organic molecules containing heteroatoms such as nitrogen, sulfur, phosphorus and oxygen (e.g. materials such as anthranilic acid, thiols, organic phosphonates and organic carboxylates). Some of these materials also act as poisons for the cathodic oxygen reduction reaction that is linked to the anodic dissolution of the metal. Slowing down the cathodic reaction slows down the overall corrosion reaction.

In various embodiments, any corrosion inhibitor as described above, or any combination of two or more corrosion inhibitors may be used to provide sufficient inhibition of corrosion of metallic surfaces. In some cases, the metallic surfaces include surfaces made of metals or alloys. In an embodiment, the corrosion inhibitor is effective for surfaces made of a metal or alloy selected from the group consisting of aluminum, steel, stainless steel, brass, bronze, carbon steel, copper, ferrous materials, iron, magnesium, nickel, titanium, and zinc. In another embodiment, the corrosion inhibitor is effective for surfaces made of a material selected from the group consisting of aluminum, aluminum alloys, stainless steel, carbon steel, and cast iron. In a further embodiment, the corrosion inhibitor is effective for surfaces made of a material selected from the group consisting of alloy steels, stainless steel, carbon steel, cast iron, and ferrous materials.

From a different perspective, corrosion inhibitors can be classified into the following classifications: passivating inhibitors, cathodic inhibitors, organic inhibitors, precipitation inhibitors, and volatile corrosion inhibitors. In an embodiment, the corrosion inhibitor is selected from the group consisting of soluble chromates, cerates, molybdates, and vanadates. In an embodiment, the corrosion inhibitor is an organic corrosion inhibitor selected from the group consisting of weak acids, carboxylates, and amine thiols. In an embodiment, the corrosion inhibitor is a combination of organic anions and cations that offers enhanced corrosion protection.

In a further embodiment, a nanostructure carrier is used to supply the corrosion inhibitor to a desired location in the oilfield. In various embodiments, the carrier have the ability to hold the corrosion inhibitors in a non-leachable or slowly-leachable form until the onset of metal corrosion triggers the release of the corrosion inhibitor, or at such time as the corrosion inhibitor is released through a triggering mechanism, such as a change in condition (e.g., temperature or pressure). In embodiments, the use of a nanostructure carrier increases the longevity of the corrosion inhibitors (or the duration of the effectiveness of the corrosion inhibitors). In embodiments, any nanostructure carrier may be used, wherein the nanostructure carrier is capable of holding or containing a corrosion inhibitor in a non-leachable or slowly-leachable fashion until a triggering mechanism is activated.

In an embodiment, the nanostructure carrier used to supply the corrosion inhibitor is added to a carrier, such as grease. In some embodiments, such carriers comprise oils, lubricants, hydraulic fluids, drilling fluids, completion fluids, or the like. In an embodiment, the corrosion inhibitor/nanostructure carrier combination is mixed with the grease before the grease is added to a corrosion susceptible location on a selected piece of mechanical equipment. In various embodiments, the grease with the combination contained therein is added to locations such as the grease seals within a pump as well as all of the metal surfaces of the mechanical equipment that are susceptible to corrosion. In an embodiment, at least a majority of the grease joints in a piece of mechanical equipment contain the corrosion inhibitor/nanostructure carrier combination containing grease. In another embodiment, all of the grease joints in a piece of mechanical equipment contain the corrosion inhibitor/nanostructure carrier combination containing grease. In an embodiment, at least a majority of the grease seals in a piece of mechanical equipment contain the corrosion inhibitor/nanostructure carrier combination containing grease. In another embodiment, all of the grease seals in a piece of mechanical equipment contain the corrosion inhibitor/nanostructure carrier combination containing grease. In some cases, the corrosion inhibitor containing grease does not contain clay nanoparticles. In this disclosure, any type of grease common for use with metallic surfaces may be used. In an embodiment, the grease is selected from the group consisting of mineral oil(s) mixed with solids, heavy asphaltic oil mixed with lighter mineral oil, extreme pressure grease, roll neck grease, and soap thickened mineral oils including sodium-base, barium-soap, lithium-soap, or calcium-soap, and combinations thereof.

In an embodiment, the nanostructure carrier used to supply the corrosion inhibitor is a nanocomposite or a material having nanoporosity. In some embodiments, nanocomposites include nanoparticles such as layered silicates, including clays. In an aspect, the nanocomposites have at least one phase having at least one dimension in the range of 0.1 to 100 nm. In another aspect, the nanocomposites have at least one phase having at least one dimension in the range of 20 to 70 nm. In an embodiment, the nanostructure carrier is a carbon based material such as carbon black, carbon nanotube, carbon nanohorn, carbon nanobud, and the like. In an embodiment, the nanostructure carrier is a fullerene. As used herein, nanoparticles are materials having three dimensions on the nanoscale; and nanotubes or the like are materials having two dimensions on the nanoscale. As used herein, the term "nanostructure" refers to a material having at least one phase having at least one dimension in the range of 0.1 to 100 nm.

In a further embodiment, the nanostructure includes polymer compositions or components. In various embodiments, such polymers include any polymeric component or combinations of polymeric components that are capable of forming polymer nanoparticles or having nanoporosity. In an embodiment, the polymers utilized in the nanoparticles or particles having nanoporosity include polyamide, polyacetal, polycarbonate, polyoxytetramethyleneoxyterephthaloyl, polybutyleneterephthalate, polyethyleneterephthalate, polyimide, polyphenylenesulfide, polysulfone, polyarylate, epoxy, or polyphenylene ether resins. In some embodiments, the polymers are mixed with 0.05 to 30 weight percent of a layered silicate. In some other embodiments, the polymers are mixed with 1 to 10 weight percent of a layered silicate. In some further embodiments, the polymers are mixed with 3 to 7 weight percent of a layered silicate. Such weight percentages are on the basis of the total weight of the polymer-silicate mixture. In various embodiments, the polymers are dry blended with the layered silicate in a suitable mechanical mixer known to one skilled in the art.

In embodiments, layered silicates include materials such as clays. In an aspect, the layered silicates include 1:1 type layered silicates structured by one tetrahedral layer per one octahedral layer. In another aspect, the layered silicates include 2:1 type layered silicates structured by two tetrahedral layers per one octahedral layer. In some embodiments, the 1:1 type layered silicate includes kaolinite, halloysite, chrysotile, or the like. In some embodiments, the 2:1 type layered silicate includes a smectite mineral such as montmorillonite, hectorite, beidellite, and saponite; a mica mineral such as muscovite and phlogopite; talc; pyrophyllite; vermiculite; and chlorite.

Clay generally describes crystalline, plate-like, 2-dimensional layered lattice alumino silicates. Thus, for example, clays of the smectite, halloysite, illite, kaolinite, montmorillonite, palygorskite groups, and various other similar materials are herein referred to as clays. As used herein, the term "clays" also refer to nanoclays or clay nanotubes, nanohorns, and the like. In some embodiments, clays are utilized as a carrier to supply the corrosion inhibitor. In various embodiments, the corrosion inhibitor is attached to the clays, encapsulated within the clay structure, or contained within the pores or nanopores of the clay or clay based composition. In an embodiment, the carrier is boehmite or a boehmite based composition.

In an embodiment, the layered silicate is a metal oxyhydroxide. In a further embodiment, the metal oxyhydroxide is selected from the group consisting of iron, aluminum, copper, magnesium, chromium, zinc and titanium. In some cases, the metal oxyhydroxide is treated with chemicals to modify the surface of the nanoparticles and to reduce the particle size down to ranges of from 20 to 70 nm. In some cases, the chemical treatment anchors the organic corrosion inhibitors to the outside surface of the nanoparticles. In some other cases, the chemical treatment changes the surface to create nanopores. In embodiments, the corrosion inhibitor is located within the nanoparticle structure, between nanoparticles, within the nanopores of the carrier, or combinations thereof.

In an embodiment, the metal oxyhydroxide is an aluminum metal hydroxide. In some cases, such aluminum metal hydroxide, also referred to as boehmite (AlOOH), comprises those produced by Sasol North America as a by-product in the production of surfactants. In some cases, these boehmite particles are surface modified with carboxylic acids, such as acrylic acid. In some embodiments, these surface modified boehmite particles serve as on-demand releasable carriers for corrosion inhibitors if the inhibitor is bound to the boehmite surface through a pH cleavable carboxylate bond. In embodiments, the initial chemical modification of the boehmite takes place by heating functionalized carboxylic acids in the presence of water and boehmite. For instance, acrylic acid contains an activated double bond. Once the acrylic acid activates the boehmite nanoparticle surface, the surface modified nanoparticles are heated in water with a corrosion inhibitor, resulting in corrosion inhibitors being anchored to the nanoparticles creating corrosion inhibitor containing carriers.

Boehmite and pseudoboehmite are aluminum oxyhydroxides of the general formula $\gamma$-AlO(OH).$xH_2O$. When x=0 the material is called boehmite; when x>0 and the materials incorporate water into their crystalline structure they are known as pseudoboehmite. Boehmite and pseudoboehmite are also described as $Al_2O_3.zH_2O$ where, when z=1 the material is boehmite and when 1<z<2 the material is pseudoboehmite. For the purposes of this specification, the term "boehmite" implies boehmite and/or pseudoboehmite.

Aluminum oxyhydroxide is to be broadly construed to include any material whose surface is or may be processed to form a shell or layer of boehmite, including specifically aluminum metal, aluminum nitride, aluminum oxynitride (AlON), $\alpha$-$Al_2O_3$, $\gamma$-$Al_2O_3$, transitional aluminas of general formula $Al_2O_3$, boehmite ($\gamma$-AlO(OH)), pseudoboehmite ($\gamma$-AlO(OH).$xH_2O$ where 0<x<1), diaspore ($\alpha$-AlO(OH)), and the aluminum hydroxides ($Al(OH)_3$) of bayerite and gibbsite.

Iron oxyhydroxide is also known as lepidocrocite, $\gamma$-FeO(OH). Boehmite and pseudoboehmite have a crystal structure that is isomorphous with lepidocrocite. Solid solutions of iron oxyhydroxide and boehmite are also known and may be referred to as either material when there is not a great predominance of one metal or the other.

In an embodiment, corrosion inhibitors are anchored to a nanostructure carrier material, such as boehmite and pseudoboehmite, through modification of the surface of the carrier material. In one embodiment, a corrosion inhibitor is anchored to the carrier material with a carboxylic acid. Methods of modifying the surface of particles are disclosed in U.S. Pat. Nos. 6,887,517; 6,933,046; 6,986,943; and 7,244,498 to Cook et al., the disclosures of which are incorporated by reference herein in their entirety.

In various embodiments, the treated materials exhibit benefits for use as carriers for corrosion inhibitors. One advantage in utilizing treated nanostructures, or materials having nanopores, as carriers is that the corrosion inhibitors are non-leachable or leachable at low rates from the treated carriers, greatly reducing the rate at which the corrosion inhibitors are released. Another advantage is that the release of the inhibitors is on demand, such as by utilizing a triggering mechanism.

In embodiments, various triggering mechanisms include: pH, solubility, pressure, temperature, chemical, mechanical, and time-based triggers. In some cases, mechanical triggers include impact, surface agitation, abrasion, shear, and any other means that causes an alteration to a structure to facilitate the release of corrosion inhibitor. In other cases, triggering mechanisms include a combination of mechanisms, such as a mechanical act that initiates a chemical or pH change. For example, a mechanical trigger releases a chemical agent that in turn activates the release of the corrosion inhibitor. All suitable triggering mechanisms are considered to be within the scope of the present invention.

Certain types of corrosion cause a rise in pH in regions affected by the corrosion. In such situations, the organic corrosion inhibitors are tethered to the surface of the treated nanostructures through a bond that is broken at a high pH, thereby providing a pH dependent release mechanism. In some embodiments, the corrosion inhibitor is released when/ and where it is needed, resulting in more efficient use of the corrosion inhibitors.

Certain properties of the nanostructure carrier allow for the use of a high concentration of corrosion inhibitors. One advantage in using nanostructures or materials having nanopores as carriers is that they have a high surface area. This high surface area creates the capacity to store a large amount of corrosion inhibitors, allowing for a high concentration of corrosion inhibitors to be used. The use of a high concentration of corrosion inhibitors extends the lifetime of the corrosion releasing nanostructure carrier, which provides improved protection of the coated metals. The on-demand release characteristic of the treated nanostructure carrier allows for the use of a high concentration of corrosion inhibitors. A benefit of having a high concentration of on-demand corrosion inhibitors is that the presence of corrosion is treated with a high dose of corrosion inhibitors when the triggering signs of corrosion are present, such as a high pH. These surface-modified carriers are useful when used in mixtures with liquids or when used as fillers in solids.

In embodiments, the corrosion inhibitor containing compositions of the present invention are applicable to any type of metallic surface that is susceptible to corrosion. In an embodiment, the metallic surfaces include mechanical equipment that is susceptible to corrosion. In another embodiment, the corrosion inhibitor containing compositions are applicable to any type of mechanical equipment commonly used in oil field applications. In a further embodiment, the mechanical equipment includes equipment selected from the group consisting of a drill bit, a rotor, a stator, a motor, a pump, a drive shaft assembly, a dump sub, a bearing assembly, a blowout preventer (BOP), a packer, drill pipe, tubing, casing, a completion tool, a production tool, a fishing tool, an agitator, a stabilizer, a centralizer, and combinations thereof. In a specific embodiment, the corrosion inhibitor containing compositions are applicable to a steel rotor and a stator of a pump.

In an embodiment, the corrosion inhibitor containing nanostructure carrier is included within an elastomer at a desired location within a piece of mechanical equipment. In an embodiment, the corrosion inhibitor containing nanostructure carrier is dispersed throughout the matrix of an elastomer. In an embodiment, the corrosion inhibitor containing nanostructure carrier is dispersed throughout the matrix of a stator elastomer and is released on demand during use. In an embodiment, the corrosion inhibitor containing nanostructure carrier is dispersed throughout the matrix of the elastomers of a roller cone drill bit seal and may be released on demand during use. In an embodiment, the corrosion inhibitor containing nanostructure carrier is dispersed throughout the matrix of an elastomer placed in a blowout preventer (BOP) wherein the corrosion inhibitor is released on demand. In an embodiment, the corrosion inhibitor containing nanostructure carrier is dispersed throughout the matrix of an elastomer placed in a packer wherein the corrosion inhibitor is released on demand.

In an embodiment, the corrosion inhibitor nanostructure carrier, such as a layered silicate, is contained within an elastomer at a desired location within or attached to a piece of mechanical equipment. In some cases, the elastomer contains the nanostructure carrier and corrosion inhibitor. In some cases, the elastomer is non-permeable to the nanostructure carrier while being permeable to the corrosion inhibitor, thereby enabling the corrosion inhibitor to be released through the elastomer at a known rate or under certain imposed conditions. In one embodiment, the elastomer is permeable to the corrosion inhibitor within a known range of conditions. For example, the elastomer is permeable to the corrosion inhibitor at a known rate under normal operating conditions, such that the corrosion inhibitor is released at a substantially constant rate while in operation. In an alternative embodiment, the elastomer is permeable to the corrosion inhibitor under abnormal operating conditions, such that the corrosion inhibitor is released upon the imposition of a condition change, such as an imposed pressure elevation or increase.

In an embodiment, the corrosion inhibitor containing nanostructure carrier is included within a coating on at least a portion of the mechanical equipment. In an embodiment, the coating includes a sealant, a tungsten carbide coating, a chrome sealant, or an epoxy. The coating may be used in any desired location on the mechanical equipment. In a further embodiment, the coating having a corrosion inhibitor containing nanostructure carrier is applied to the area(s) of the mechanical equipment that are susceptible to corrosion.

In an aspect, a power section rotor has a protective coating on the outer surface, wherein the coating contains a corrosion inhibiting additive in which organic corrosion inhibitors are anchored to nanostructures having high surface areas. The corrosion inhibitors are released on-demand or upon a triggering event. In some embodiments, the corrosion inhibitors are applied on the outer surface as a part of a resin from which they are released when corrosion occurs. In some other embodiments, the corrosion inhibitors are placed in a reservoir or a capsule situated in a rotor cavity or attached to the rotor outer diameter from which they are released on-demand to stop or retard corrosion.

In certain embodiments, the release of corrosion inhibitors is under the control of workers in the field. In an embodiment, the release of corrosion inhibitors is brought about by an increase in pressure, which is controlled by workers in the field. The increase in pressure is applied to the carrier, causing the release of the corrosion inhibitor.

In an embodiment, the corrosion inhibitor is included within the matrix of a piece of mechanical equipment. In some cases, the corrosion inhibitor is included within the matrix of a portion of a drill bit and the corrosion inhibitor is released upon the wearing down of the portion containing the inhibitor. In an embodiment, the corrosion inhibitor is dispersed throughout the matrix of a portion of a piece of mechanical equipment such as a cladding on the surface. As the cladding is eroded, the corrosion inhibitor is released. In some other embodiments, the corrosion inhibitor is included in the matrix of an addition to the piece of mechanical equipment in an area that is known to experience erosion. For example, the corrosion inhibitor is included within the matrix of an insert that is placed within a zone of high erosion, such as where a significant flow of solid laden fluid is located. Upon the natural erosion of the insert from the fluid flow, the corrosion inhibitor contained within the matrix of the insert is released.

FIG. 1 is a cross sectional illustration of a progressive cavity (PC) pump in accordance with an embodiment of the invention. The PC pump 10 includes a rotor 12 and a stator 14 contained within a housing 16. In an embodiment, the corrosion inhibitor is incorporated within the matrix of the rotor 12, the stator 14, the housing 16, or other portion of the PC pump 10. In an embodiment, the corrosion inhibitor is incorporated within a coating of the rotor 12, the stator 14, the housing 16, or other portion of the PC pump 10 such as bearings or seals (not shown). In an embodiment, the corrosion inhibitor is incorporated within the elastomer portions of the stator 14.

Figure 2:
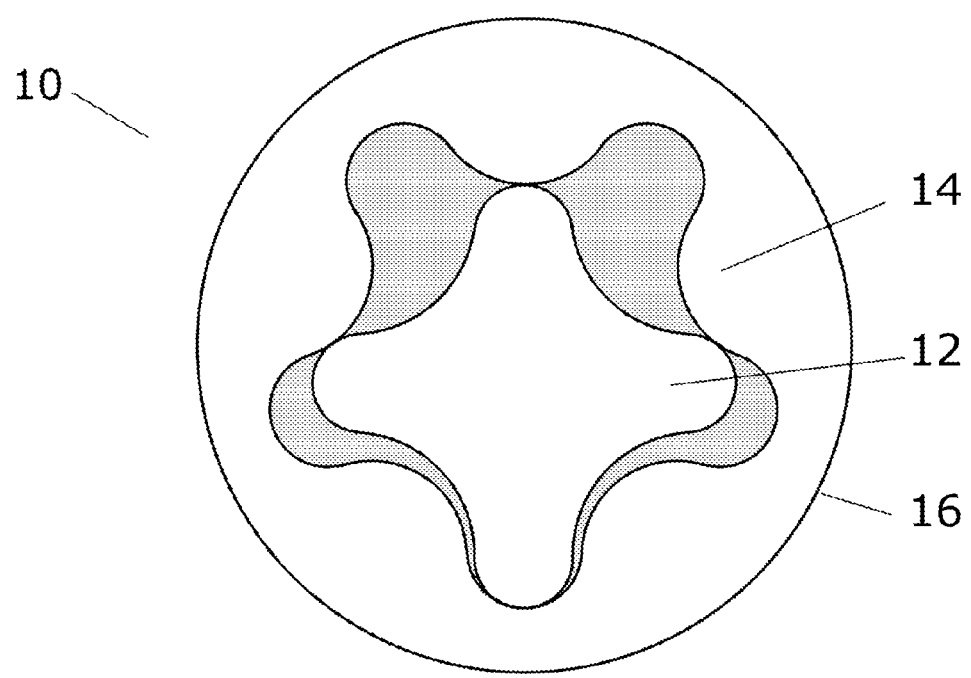
FIG. 2 is a cross sectional illustration of a rotor and stator of a PC pump in accordance with an embodiment, of the present invention.

FIG. 2 is a cross sectional illustration of a rotor and stator of a PC pump in accordance with an embodiment of the invention. The PC pump 10 includes a rotor 12 and a stator 14 contained within a housing 16. In an embodiment, the corrosion inhibitor is incorporated within the matrix of the rotor 12, the stator 14, the housing 16, or other portion of the PC pump 10. In an embodiment, the corrosion inhibitor is incorporated within a coating of the rotor 12, the stator 14, the housing 16, or other portion of the PC pump 10 such as bearings or seals (not shown). In an embodiment, the corrosion inhibitor is incorporated within the elastomer portions of the stator 14. In an embodiment, the corrosion inhibitor is incorporated in a PC pump 10 used to create torque for a downhole tool or drill bit or in a PC pump 10 used as a lift pump to raise production fluids from the well.

Figure 3:
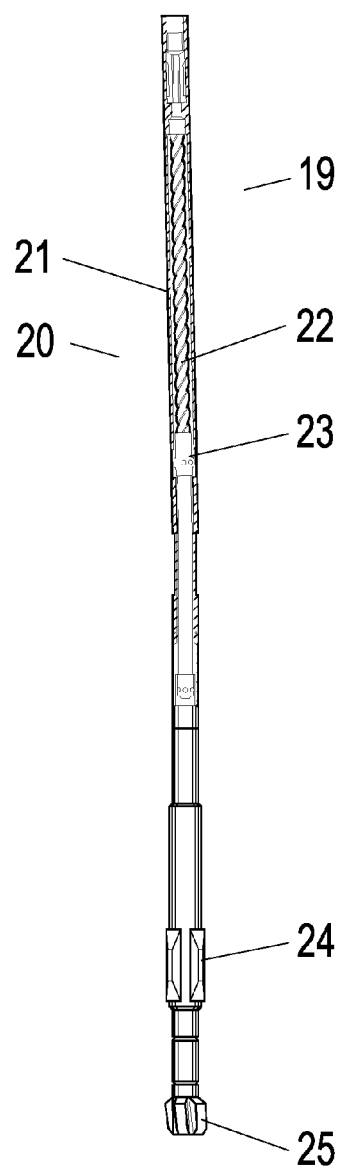
FIG. 3 is a cross sectional illustration of a bottom hole assembly with components incorporating an embodiment, of the present invention.

FIG. 3 is an illustration of a bottom hole assembly (BHA) 19 having components in accordance with an embodiment of the invention. The BHA includes a mud motor portion 20 with drive components 21, a drive shaft assembly 22 with a universal joint 23, a stabilizer 24, and a drill bit 25. In an embodiment, the corrosion inhibitor is incorporated within the matrix of the motor components 21 such as a rotor and stator as described above with the PC pump 10 in FIGS. 1 and 2. In an embodiment, the corrosion inhibitor is incorporated within any components of the drive shaft assembly 22 or the universal joint 23, including any elastomeric portions or seals incorporated therein. In a further embodiment, the corrosion inhibitor is incorporated within the matrix of the stabilizer 24 or the drill bit 25. In an embodiment, the BHA 19 is suspended from drill pipe or coiled tubing.

Figure 4:
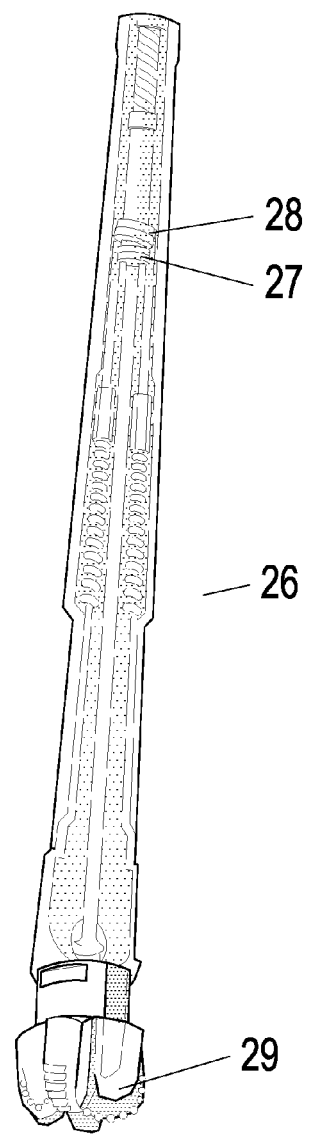
FIG. 4 is a cross sectional illustration of bottom hole assembly with a bearing assembly in accordance with an embodiment, of the present invention.

FIG. 4 is an illustration of a BHA 26 having a bearing assembly 27 in accordance with an embodiment of the invention. The bearing assembly 27 contains bearings 28, seals (not shown), and a passage to permit drilling mud to pass through to a drill bit 29. In an embodiment, the corrosion inhibitor is incorporated within the matrix of the bearing assembly 27 and within the bearings. In an embodiment, the corrosion inhibitor is incorporated within wear surfaces within the bearing assembly 27 to enable release of the corrosion inhibitor. In an embodiment, the seals within the bearing assembly are elastomeric. In an embodiment, the corrosion inhibitor and/or nanostructure carrier is incorporated within the elastomeric seals.

Figure 5:
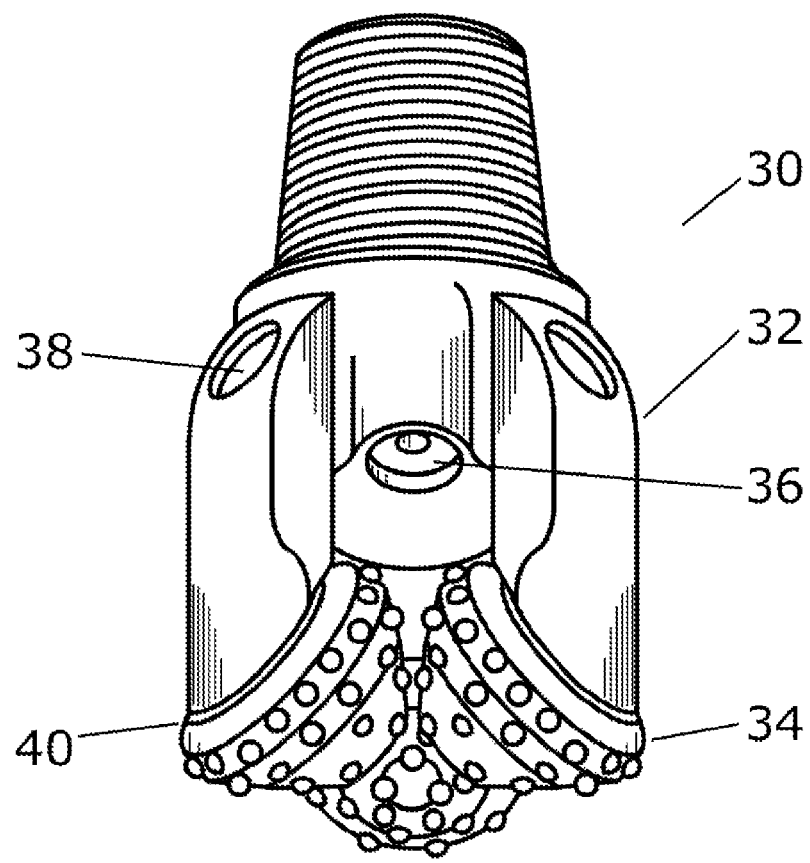
FIG. 5 is an illustration of a roller cone drill bit having elements in accordance with an embodiment, of the present invention.

FIG. 5 is an illustration of a drill bit 30 having elements in accordance with an embodiment of the invention. The bit has an external surface 32, one or more cutting elements 34, one or more nozzles 36, may contain recessed areas 38, and may contain bearings 40. In an embodiment, the corrosion inhibitor is incorporated within the matrix of the bit. In an embodiment, the corrosion inhibitor is contained within the matrix of a coating on a portion of the surface 32, such as a hardfacing material. In an embodiment, the corrosion inhibitor is incorporated within the matrix of the nozzle 36 or adjacent to the nozzle 36 such that flow of drilling fluid through the nozzle 36 enables the release of the corrosion inhibitor, such as through a known erosion rate of the nozzle or an attachment thereof. In an embodiment, the corrosion inhibitor is incorporated within the matrix of a bearing 40 or seal. In an embodiment, the corrosion inhibitor is incorporated within an insert, such as placed within a recessed area 38 of the bit.

Figure 6:
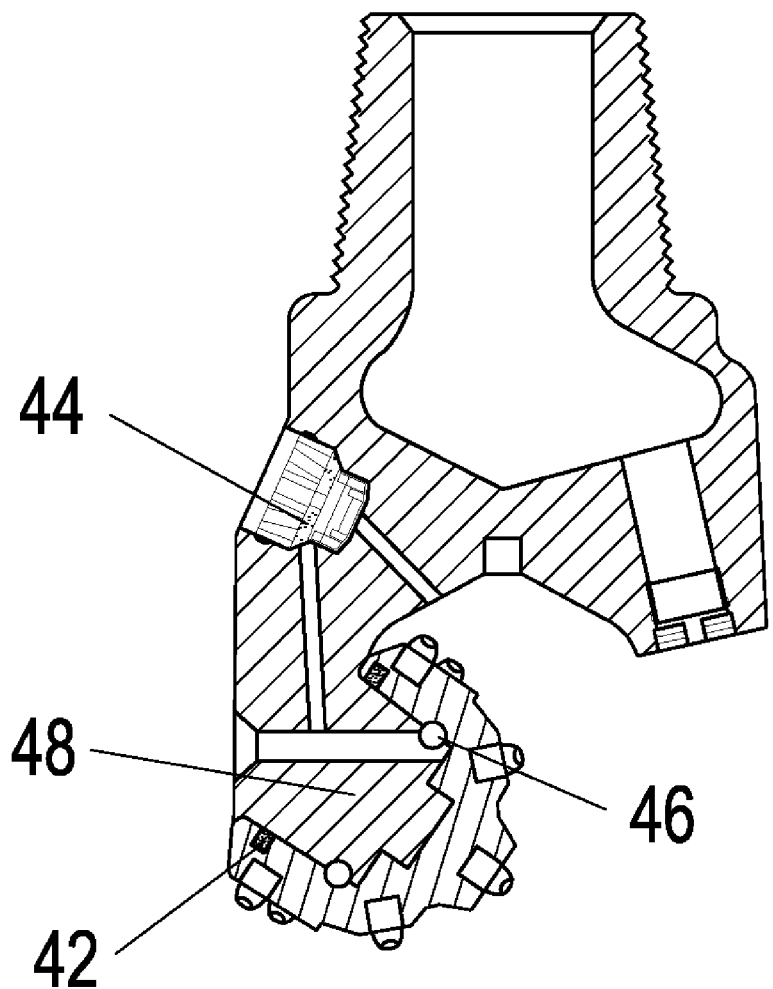
FIG. 6 is a cross section of a roller cone drill bit illustrating a bearing assembly having elements in accordance with an embodiment, of the present invention.

In an embodiment, the corrosion inhibitor is incorporated within the matrix of any bearing assembly for use in a corrosive environment. By way of a non-limiting example, FIG. 6 illustrates the cross section of a roller cone drill bit having elements in accordance with an embodiment of the invention. Bearing assemblies of motors, pumps, and blow-out preventers, and drill string tools may also have elements in accordance with an embodiment of the invention as similarly illustrated in FIG. 6. In an embodiment, the corrosion inhibitor and/or nanostructure carrier is incorporated within an elastomeric seal 42. In an embodiment, the corrosion inhibitor is incorporated in a lubricant stored in a reservoir 44 for lubricating bearings 46. In a further embodiment, the corrosion inhibitor is incorporated within the bearing spindle 48 or another wear surface within the bearing assembly to enable release of the corrosion inhibitor.

Figure 7:
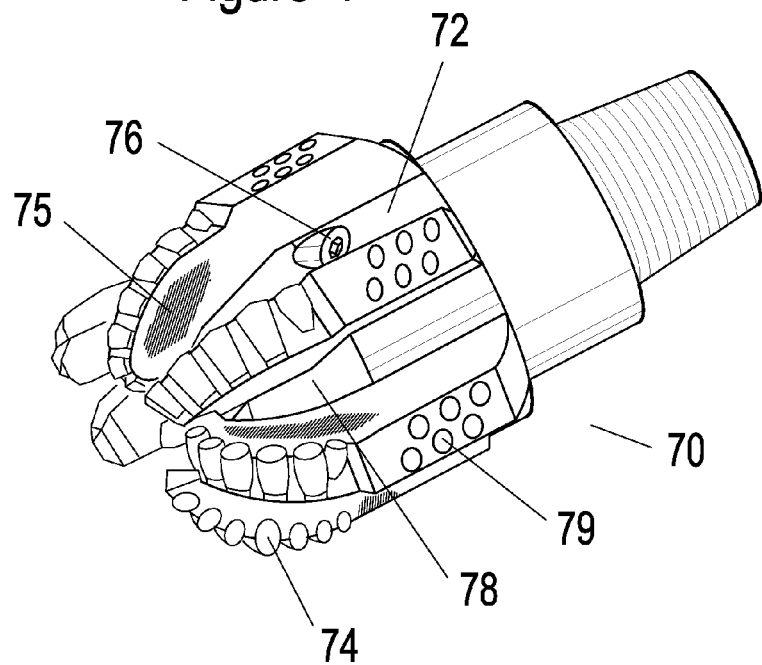
FIG. 7 is an illustration of a fixed cutter drill bit having elements in accordance with an embodiment, of the present invention.

FIG. 7 is an illustration of a fixed cutter drill bit 70 having elements in accordance with an embodiment of the present invention. The bit has an external surface 72, one or more cutting elements 74 on one or more blades 75, one or more nozzles 76, may contain recessed areas 78, and may contain abrasive resistant inserts 79. In an embodiment, the corrosion inhibitor is incorporated within the matrix of the bit and is contained with the matrix of a coating on a portion of the surface 72 such as hardfacing material. In an embodiment, the corrosion inhibitor is incorporated within the matrix of the nozzle 76 or adjacent to the nozzle such that flow of drilling fluid through the nozzle 76 enables the release of the corrosion inhibitor, such as through a known erosion rate of the nozzle or an attachment thereof. In a further embodiment, the corrosion inhibitor is incorporated within the matrix of the blades 75 such that erosion of the blades 75 enables the release of the corrosion inhibitor. In an embodiment, the corrosion inhibitor is incorporated within a cutting element 74 or an insert 79 that is placed within a recessed area 78.

Figure 8:
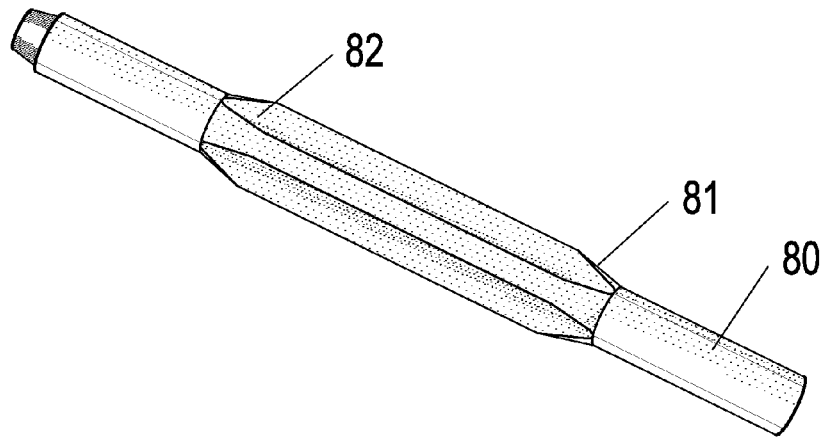
FIG. 8 is an illustration of a drill string stabilizer having elements in accordance with an embodiment, of the present invention.

FIG. 8 is an illustration of a drill string stabilizer having elements in accordance with an embodiment of the present invention. The stabilizer has an external surface 80, one or more blades 81, and one or more recessed areas 82. In an embodiment, the corrosion inhibitor is incorporated within the matrix of the stabilizer, and is contained within the matrix of a coating on a portion of the surface 80 such as hardfacing material. In another embodiment, the corrosion inhibitor is incorporated within a blade 81 or a recessed area 82 such that erosion of the blade 81 or the recessed area 82 enables the release of the corrosion inhibitor.

Figure 9:
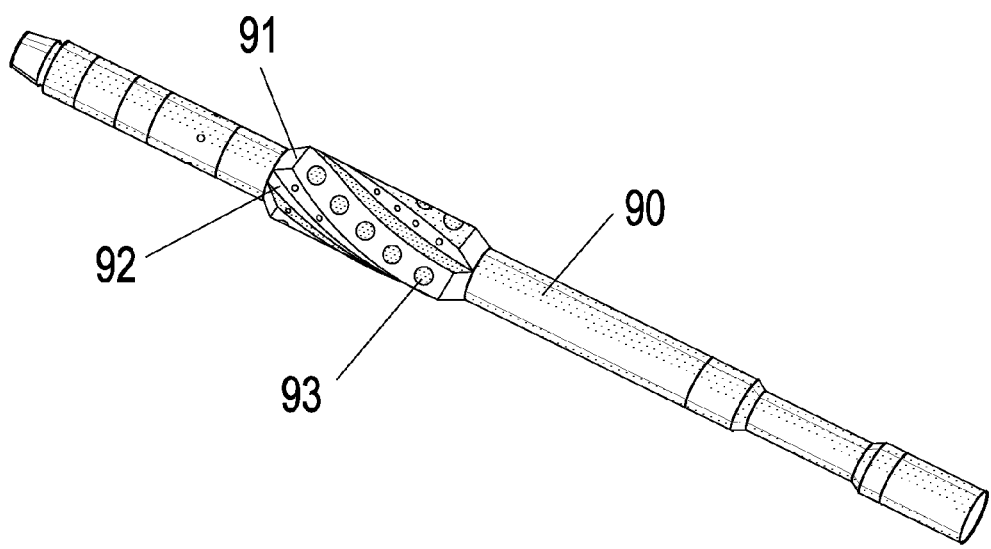
FIG. 9 is an illustration of a variable gauge stabilizer having elements in accordance with an embodiment, of the present invention.

FIG. 9 is an illustration of a variable gauge stabilizer having elements in accordance with an embodiment of the present invention. The variable gauge stabilizer has an external surface 90, one or more blades 91, one or more recessed areas 92, and a plurality of actuated pistons 93. In an embodiment, like the stabilizer of FIG. 8, the corrosion inhibitor is incorporated within the matrix of the variable gauge stabilizer, within the matrix of a coating on the external surface 90, within a blade 91, or a recessed area 92. In a further embodiment, the corrosion inhibitor is incorporated within the pistons 93. In an embodiment, the variable gauge stabilizer includes seals (not shown) which are elastomeric and incorporate the corrosion inhibitor and/or nanostructure carrier.

FIG. 10 is an illustration of a centralizer 100 having elements in accordance with an embodiment of the present invention. The centralizer 100 has a plurality of fins 101, that may be bowsprings or other centralizing means, and at least one collar 102 to attach to a downhole line 103. In an embodiment, the downhole line 103 is a wire or a tubular member such as coiled tubing. In an embodiment, the corrosion inhibitor is incorporated within the plurality of fins 101, or the collar 102, or the line 103, or combinations thereof. In an embodiment, the plurality of fins 101, collar 102, or the line 103 include elastomers, and the corrosion inhibitor and/or nanostructure carrier is incorporated therein.

FIG. 11 is an illustration of an agitator having elements in accordance with an embodiment of the present invention. The agitator 110 has an internal oscillating member 111, an oscillation passage 112, and seals (not shown). In an embodiment, the corrosion inhibitor is incorporated within the matrix of the oscillating member 111, oscillation passage 112, or the seals. In a further embodiment, the oscillating member 111, oscillation passage 112, or the seals include elastomeric elements and incorporate the corrosion inhibitor and/or nanostructure carrier.

Figure 12:
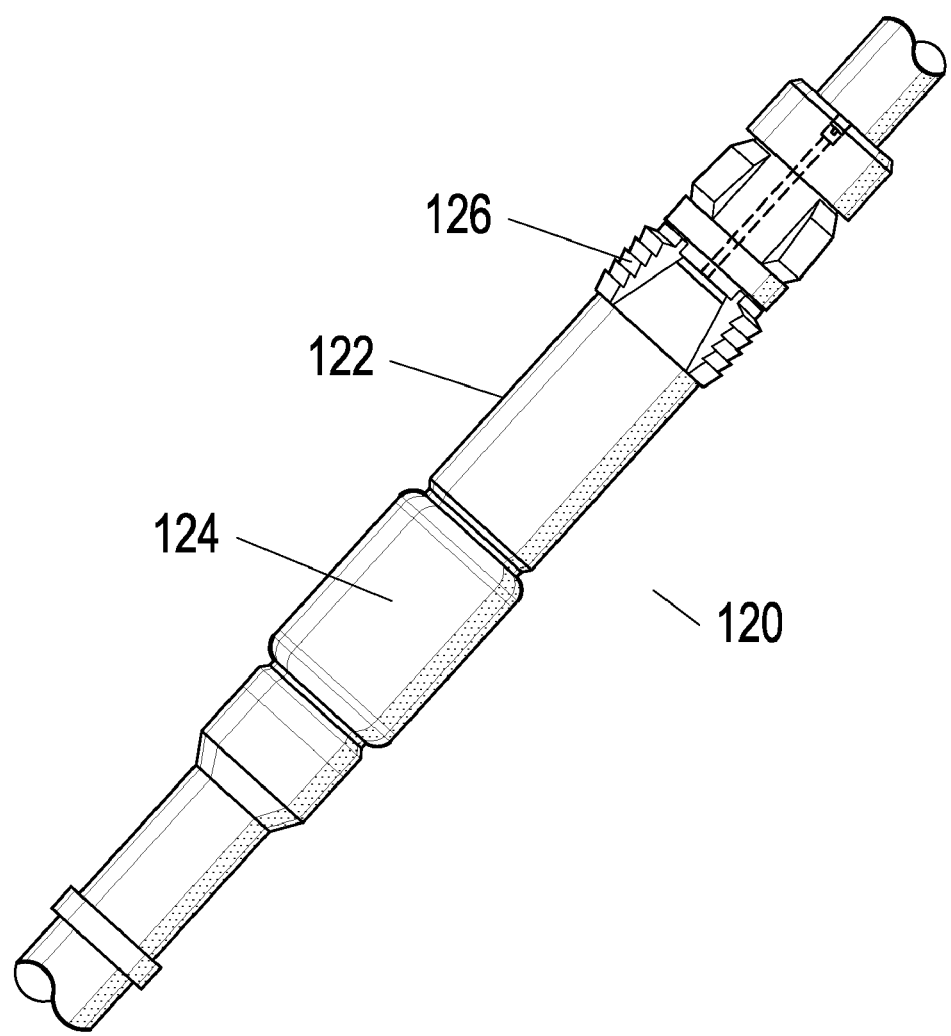
FIG. 12 is an illustration of a packer having elements in accordance with an embodiment, of the present invention.

FIG. 12 is an illustration of a packer having elements in accordance with an embodiment of the invention. In an embodiment, the packer 120 has a body 122, packing elements 124, and seating elements 126. In an embodiment, the packing elements 124 include an elastomeric compound. In an embodiment, the packing elements 124 are axially compressed and thereby expand in a radial direction to form a seal against a casing or wellbore. In an embodiment, the packing elements are also hydraulically expanded in a radial direction to form a seal against a casing or wellbore. In an embodiment, the corrosion inhibitor is contained within the packing elements 124 and is released in a controlled manner when the packing elements 124 are compressed. In an embodiment, the seating elements 126 contain a surface that seat or affix to a casing or wellbore when actuated. In an embodiment, the seating elements 126 are forced to expand in a radial direction to contact and engage against a casing or wellbore so that the packer 120 resists movement within the well. In an embodiment, the corrosion inhibitor is incorporated within the matrix of the body 122, packing elements 124, seating elements 126, or other portions of the packer 120 whether shown or described herein or not. In an embodiment, the corrosion inhibitor is incorporated within a coating of the body 122, packing elements 124, seating elements 126, or other portions of the packer 120.

Figure 13:
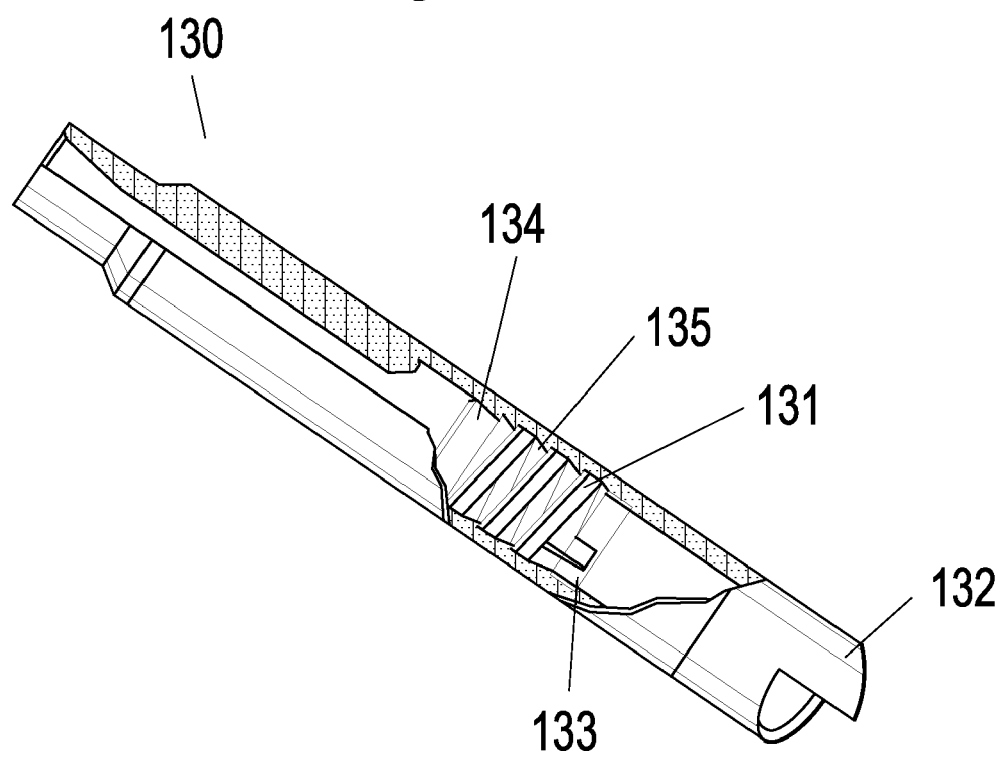
FIG. 13 is an illustration of a fishing tool having elements in accordance with an embodiment, of the present invention.

FIG. 13 is an illustration of a fishing tool having elements in accordance with an embodiment of the invention. The fishing tool 130 has a spiral grapple 131, a guide 132, a spiral grapple control 133, a packer 134, and a bowl 135. In an embodiment, the corrosion inhibitor is incorporated within the matrix of the spiral grapple 131, the guide 132, the spiral grapple control 133, or the bowl 135. In an embodiment, the corrosion inhibitor is released as these components wear. In an embodiment, the packer 134 is an elastomer and incorporates the corrosion inhibitor and/or nanostructure carrier. FIG. 13 is a non-limiting example of a fishing tool. Numerous other types of fishing tools may incorporate the corrosion inhibitor with the matrix of the components.

Figure 14:
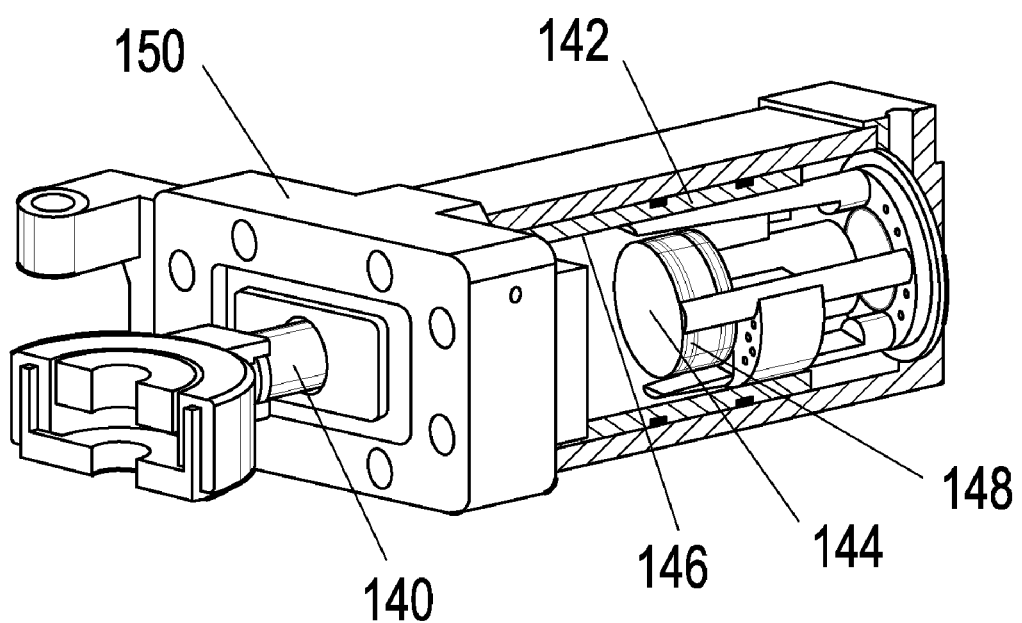
FIG. 14 is an illustration of a blow out preventer having elements in accordance with the present invention.
Figure 15:
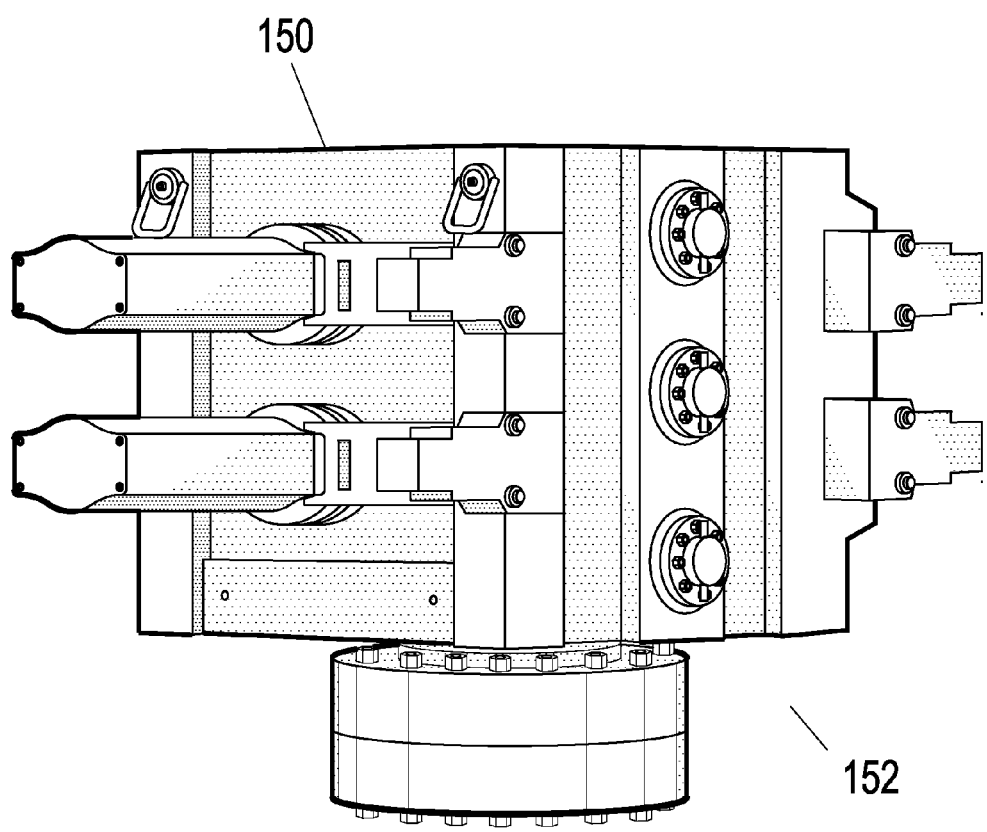
FIG. 15 is an illustration of a blow out preventer having elements in accordance with an embodiment, of the present invention.

FIG. 14 is an illustration of a component of a blow out preventer having elements in accordance with an embodiment of the present invention. The blow out preventer has a ram shaft 140, a ram piston 142, a locking piston 144, an interior surface 146, at least one seal 148, and an exterior surface 150. In an embodiment, the corrosion inhibitor is incorporated within the matrix of the blow out preventer and is contained within the matrix of a coating on a portion of the exterior surface 150. In an embodiment, the corrosion inhibitor is incorporated in a lubricant for lubricating the ram shaft 140, ram piston 142, or locking piston 144. In an embodiment, the corrosion inhibitor is incorporated in a hydraulic fluid (not shown) for actuating the ram shaft 140, ram piston 142, or locking piston 144. In an embodiment, the corrosion inhibitor and/or nanostructure carrier is incorporated within an elastomeric seal 148 or within the matrix of the interior surface 146. FIG. 15 illustrates a fully assembled blow out preventer 152. In an embodiment, the corrosion inhibitor is incorporated with the matrix of a coating on a portion of the external surface of the blow out preventer 150 that may encounter a corrosive environment.

In embodiments, the corrosion inhibitor are incorporated within the matrix of any component of the drill string or downhole assembly including lift rods, lift pumps, coiled tubing, drill pipe, or casing that may encounter a corrosive environment. In furthermore embodiments, the corrosion inhibitor is incorporated within the matrix of a coating on any component of the drill string including a drill bit, a rotor, a stator, a motor, a pump, a drive shaft assembly, a dump sub, a bearing assembly, a blowout preventer (BOP), a packer, drill pipe, tubing, casing, a completion tool, a production tool, a fishing tool, an agitator, a stabilizer, a centralizer, and combinations thereof that may encounter a corrosive environment Various terms are used herein, to the extent a term used in not defined herein, it should be given the broadest definition persons in the pertinent art have given that term as reflected in printed publications and issued patents.

As used herein, the term "attaching" means combining two or more materials in any manner, such as absorbing, activating, affixing, bonding, filling, impregnating, and the like, or combinations thereof.

As used herein, the term "adjacent" means locating proximately and includes adjoining, abutting, encasing, mixing, embedding, and the like, or combinations thereof.

As used herein the term "nanostructure" refers to a material having at least one dimension of less than 100 nm.

As used herein, the term "polymeric component" refers to the polymer phase of a nanocomposite.

As used herein, the term "carrier" refers to a medium for supplying a corrosion inhibitor.

As used herein, the term "corrosion inhibitor" includes a chemical compound that decreases the corrosion rate of a metal or an alloy.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof.

What is claimed is:

1. A method of supplying a corrosion inhibitor to a downhole metal component, comprising:
    forming a nanostructure carrier configured as an insert on a downhole tool;
    impregnating the nanostructure carrier with a corrosion inhibitor;
    positioning the nanostructure carrier in an environment adjacent a downhole component; and
    releasing the corrosion inhibitor from the nanostructure carrier into the environment adjacent the downhole metal component.

2. The method of claim 1, wherein forming a carrier comprises forming a material having a nanoporosity consisting of at least one material chosen from the group consisting of: kaolinites, halloysites, chrysotiles, montmorillonites, hectorites, beidellites, saponites, muscovites, phlogopites, talcs, pyrophyllites, vermiculites, chlorites, carbon black, carbon nanotubes, carbon nanobuds, carbon nanohorns, fullerenes, polyamides, polyacetals, polycarbonates, polyoxytetramethyleneoxyterephthaloyl, polybutyleneterephthalate, polyethyleneterephthalate, polyimide, polyphenylenesulfide, polysulfones, polyarylates, epoxies, polyphenylene ether resins, metal oxyhydroxides, and combinations thereof.

3. The method of claim 1, wherein a corrosion inhibitor comprises at least one composition chosen from the group consisting of carbonates, silicates, phosphates, chromates, cerates, molybdates, vanadates, organic molecules containing heteroatoms such as nitrogen, sulfur, phosphorus and oxygen, anthranilic acid, thiols, organic phosphonates, organic carboxylates, organic anions, organic cations, and combinations thereof.

4. The method of claim 1, wherein releasing the corrosion inhibitor comprises exposing the carrier to at least one mechanical condition chosen from the group consisting of impact, surface agitation, abrasion, shear, an alteration in the carrier structure, and combinations thereof.

5. The method of claim 1, wherein releasing the corrosion inhibitor from the carrier further comprises causing the corrosion inhibitor to be released upon the occurrence of at least one change in the conditions in the environment adjacent the downhole component chosen from the group consisting of pressure changes, temperature changes, pH changes, chemical changes, and combinations thereof.

6. The method of claim 1, wherein releasing the corrosion inhibitor from the carrier into the environment adjacent the downhole component comprises controlling the release of the corrosion inhibitor.

7. The method of claim 6, wherein controlling the corrosion inhibitor release comprises an on-demand release by workers in the field.

8. A method of supplying the corrosion inhibitor to a downhole metal component, comprising:
    forming a nanostructure elastomer, configured for placement within a downhole tool;
    impregnating the nanostructure elastomer with a corrosion inhibitor;
    positioning the nanostructure elastomer in an environment adjacent a downhole component; and
    releasing the corrosion inhibitor from the nanostructure elastomer into the environment adjacent the downhole metal component.

9. The method of claim 8, wherein forming an elastomer further comprises forming an elastomer having a nanostructure with nanoporosity.

10. The method of claim 8, wherein impregnating the elastomer with a corrosion inhibitor comprises impregnating the elastomer with a corrosion inhibitor that is attached to a nanostructure carrier.

11. The method of claim 8, wherein configuring the elastomer further comprises configuring the elastomer to release the corrosion inhibitor into the environment adjacent the downhole component in response to a condition chosen from the group consisting of impact, surface agitation, abrasion, shear, pressure changes, temperature changes, pH changes, chemical changes, and combinations thereof.

12. The method of claim 11, wherein configuring the elastomer to release the corrosion inhibitor into the environment adjacent the downhole comprises controlling the release of the corrosion inhibitor.

13. The method of claim 12 wherein controlling the elastomer release of the corrosion into the environment adjacent the downhole comprises on-demand release by workers in the field.

* * * * *